(12) United States Patent
Sato et al.

(10) Patent No.: US 11,289,779 B2
(45) Date of Patent: Mar. 29, 2022

(54) BATTERY WIRING MODULE

(71) Applicant: Sumitomo Wiring Systems, Ltd., Mie (JP)

(72) Inventors: Hiroshi Sato, Mie (JP); Ryota Mori, Mie (JP); Hisayoshi Yaita, Mie (JP); Masami Suzuki, Mie (JP); Maya Nakasuka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/990,336

(22) Filed: Aug. 11, 2020

(65) Prior Publication Data

US 2021/0066694 A1    Mar. 4, 2021

(30) Foreign Application Priority Data

Aug. 29, 2019  (JP) .............................. JP2019-156335

(51) Int. Cl.
| | |
|---|---|
| *H01M 2/24* | (2006.01) |
| *H01M 50/502* | (2021.01) |
| *H01M 10/42* | (2006.01) |
| *H01M 50/20* | (2021.01) |
| *H01M 50/147* | (2021.01) |
| *H01M 50/543* | (2021.01) |

(52) U.S. Cl.
CPC ....... *H01M 50/502* (2021.01); *H01M 10/425* (2013.01); *H01M 50/147* (2021.01); *H01M 50/20* (2021.01); *H01M 50/543* (2021.01); *H01M 2220/20* (2013.01)

(58) Field of Classification Search
CPC .. H01M 50/502; H01M 50/543; H01M 50/20; H01M 50/147; H01M 10/425; H01M 2220/20
See application file for complete search history.

(56) References Cited

U.S. PATENT DOCUMENTS

2018/0337388 A1* 11/2018  Chaen ................. H01M 50/502
2019/0027733 A1    1/2019  Hashimoto

FOREIGN PATENT DOCUMENTS

JP           2019-021593          2/2019

* cited by examiner

*Primary Examiner* — Jane J Rhee
(74) *Attorney, Agent, or Firm* — Greenblum & Bernstein, P.L.C.

(57) ABSTRACT

Provided is a battery wiring module that can suppress a case in which a cover comes off. The battery wiring module includes a housing having a wire storage groove that stores multiple wires. The housing includes a first storage groove and second storage grooves that both extend in an X direction and are arranged side by side in a Y direction orthogonal to the X direction, and third storage grooves that are in communication with the first storage groove and the second storage grooves. The housing includes a first cover, second covers, and third covers that respectively cover the first storage groove, the second storage grooves, and the third storage grooves. The first cover has abutting portions that abut on outer surfaces on sides of the third covers opposite to the underside surfaces opposing the third storage grooves.

11 Claims, 3 Drawing Sheets

BATTERY WIRING MODULE

TECHNICAL FIELD

The present invention relates to a battery wiring module.

BACKGROUND ART

A battery in which multiple battery cells are aligned in series or in parallel is mounted as, for example, a travel drive power source in a vehicle such as an electric automobile or a hybrid automobile. As shown in JP 2019-21593A, a battery wiring module is mounted on the battery. This battery wiring module includes multiple wire terminals connected to multiple bus bars that connect battery terminals of adjacent battery cells, multiple wires each having one end side to which a wire terminal is connected, and a housing containing the multiple wire terminals and the multiple wires. The housing has multiple storage grooves that store the wires and extend in one direction. The multiple storage grooves are arranged side by side in two rows in a direction orthogonal to the extension direction. Also, the housing has covers that cover the storage grooves.

JP 2019-21593A is an example of related art.

Incidentally, in some cases, the wires are arranged so as to cross between the storage grooves provided in the two rows in the battery wiring module. In this case, another storage groove that is in communication with these storage grooves is provided between the storage grooves, and the wires are arranged so as to cross between the storage grooves via the other storage groove. Since the other storage groove is normally shorter than the storage grooves provided in the two rows, there is concern that a cover provided in the short section will be likely to come off.

The present disclosure aims to provide a battery wiring module that can suppress a case in which a cover comes off.

SUMMARY OF THE INVENTION

A battery wiring module according to the present disclosure includes: a plurality of wire terminals that are respectively connected to a plurality of bus bars that connect battery terminals of a plurality of battery cells; a plurality of wires that are respectively connected to the plurality of wire terminals; and a housing storing the plurality of wire terminals and the plurality of wires. The housing includes a first storage groove for storing the wires, a first cover for covering the first storage groove, a second storage groove for storing the wires, a second cover for covering the second storage groove, a third storage groove for storing the wires, and a third cover for covering the third storage groove. The first storage groove and the second storage groove extend in the same direction as each other and are arranged side by side in a direction orthogonal to the extension direction. The third storage groove is in communication with the first storage groove and the second storage groove, the third cover includes an underside surface that opposes the third storage groove and an outer surface on a side opposite to the underside surface. The first cover has an abutting portion that abuts on the outer surface of the third cover.

According to the present disclosure, it is possible to provide a battery wiring module that can suppress a case in which a cover comes off.

EMBODIMENTS OF THE INVENTION

Figure 1:
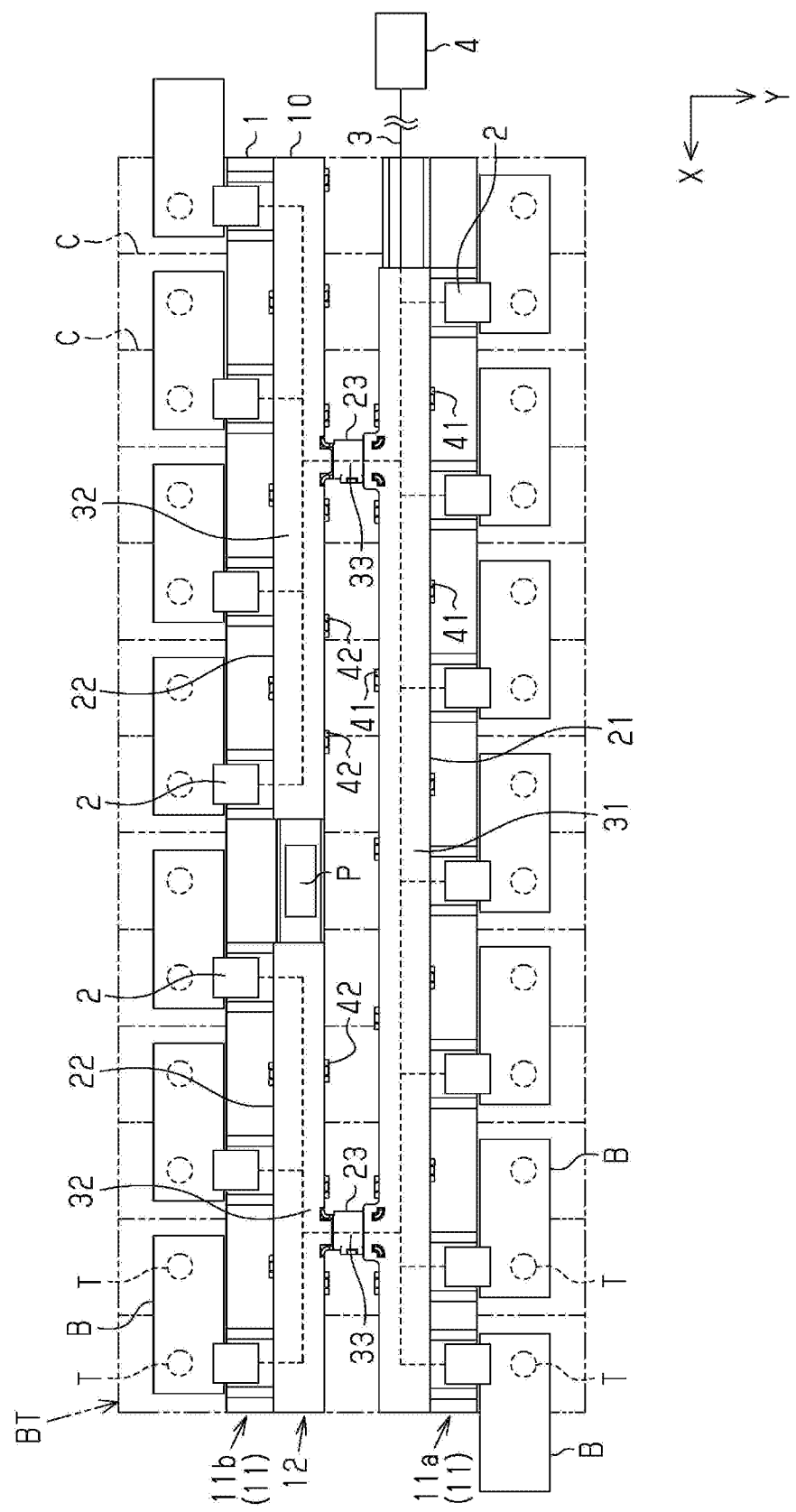
FIG. 1 is a top view of a battery wiring module in a state of being attached to a secondary battery in one embodiment.

Description of the Embodiments of the Disclosure

First, embodiments of the present disclosure will be listed and described.

A battery wiring module according to the present disclosure includes:

[1] a plurality of wire terminals that are respectively connected to a plurality of bus bars that connect battery terminals of a plurality of battery cells; a plurality of wires that are respectively connected to the plurality of wire terminals; and a housing storing the plurality of wire terminals and the plurality of wires. The housing includes a first storage groove for storing the wires, a first cover for covering the first storage groove, a second storage groove for storing the wires, a second cover for covering the second storage groove, a third storage groove for storing the wires, and a third cover for covering the third storage groove. The first storage groove and the second storage groove extend in the same direction as each other and are arranged side by side in a direction orthogonal to the extension direction. The third storage groove is in communication with the first storage groove and the second storage groove. The third cover includes an underside surface that opposes the third storage groove and an outer surface on a side opposite to the underside surface. The first cover has an abutting portion that abuts on the outer surface of the third cover.

According to the above-described aspect, it is possible to restrict movement of the third cover to the outer surface side due to the abutting portion of the first cover abutting on the outer surface of the third cover. That is, since the third cover can be restricted from moving in the direction of separating from the third storage groove, it is possible to suppress a case in which the third cover comes off. Note that there is no limitation to the abutting of the abutting portion on the outer surface of the third cover being always abutting in a state in which the first cover and the third cover the first storage groove and the third storage groove respectively, and the abutting encompasses abutting in a case in which the third cover has moved in the direction of separating from the third storage groove.

[2] It is preferable that the plurality of wire terminals are arranged side by side in the extension direction of the first storage groove and the second storage groove.

According to the above-described aspect, it is possible to achieve a configuration in which the multiple wire terminals are easily arranged along the first storage groove and the second groove when the multiple wire terminals are arranged side by side in one direction.

[3] It is preferable that the abutting portion protrudes toward the third storage groove relative to the first storage groove.

According to the above-described aspect, the abutting portion can be arranged over the third storage groove. The abutting portion can suitably suppress a case in which the third cover comes off from the state of covering the third storage groove by abutting on the third cover over the third storage groove.

[4] It is preferable that the first cover includes engaging portions for engaging with the first storage groove, and the engaging portions are provided at positions adjacent to the abutting portion.

According to the above-described aspect, the force that acts on the abutting portion when the third cover attempts to move in the direction of separating from the third storage groove is received by the engagement portions adjacent to the abutting portion. Accordingly, it is possible to suppress a case in which the abutting portion rises due to the abutting on the third cover and the suppression of the movement of the third cover by the abutting portion is no longer effective, and as a result, it is possible to suitably suppress a case in which the third cover comes off.

[5] It is preferable that the engaging portions are provided on both sides of the abutting portion.

According to the above-described aspect, the rising of the abutting portion due to the abutting on the third cover can be more suitably suppressed, and as a result, it is possible to more suitably suppress a case in which the third cover comes off.

[6] It is preferable that the third cover is joined to the third storage groove via a hinge, and the third cover is arranged at an open position at which the third storage groove is not covered, through rotation from a closed position at which the third storage groove is covered, to the outer surface side, using the hinge as an axis.

According to the above-described aspect, when the third storage groove is to be covered, the third cover is merely rotated to the closed position. This can contribute to an improvement in assemblability. Also, the rotation to the outer surface side when the third cover is opened can be restricted due to the abutting portion abutting on the outer surface of the third cover.

[7] It is preferable that the second cover includes an extension portion that extends over the third storage groove in the orthogonal direction.

According to the above-described aspect, the third storage groove is covered not only by the third cover but also by the extended portion, and therefore a portion of the third storage groove that is not covered by the third cover can be covered by the extended portion. This can contribute to the protection of the third storage groove.

DETAILED DESCRIPTION OF THE EMBODIMENTS OF THE DISCLOSURE

Hereinafter, a specific example of a battery wiring module of the present disclosure will be described with reference to the drawings below. Note that the present disclosure is not limited to these illustrative examples but is indicated by the scope of the claims, and all modifications that fall within the meaning and range of equivalency to the scope of the claims are intended to be encompassed therein.

As shown in FIG. 1, the battery wiring module 1 is mounted on an approximately cuboid-shaped secondary battery BT. The secondary battery BT is mounted in an electric automobile, a hybrid automobile, or the like. Also, the secondary battery BT supplies power to a travel motor of the vehicle and receives a supply of power from the travel motor and a power generation motor in response to a charging state or a driving state of the vehicle. The secondary battery BT includes multiple battery cells C that are arranged side by side in one direction. In the following description, the direction in which the battery cells C are arranged side by side is the X direction, and the direction orthogonal to the X direction is the Y direction. Also, the direction orthogonal to the X direction and the Y direction is the up-down direction, and the side of the secondary battery BT on which the battery wiring module 1 is mounted is the upper side.

The battery cells C each include two battery terminals T. One of the two battery terminals is a cathode-side terminal and the other is an anode-side terminal. When the battery cells C are arranged side by side in the X direction, the two battery terminals T are arranged side by side in the Y direction on the surface opposing the battery wiring module 1, that is, the upper surface. At this time, the battery cells C are arranged side by side with the orientations of the battery cells alternatingly reversed such that the cathode-side battery terminals T and the anode-side battery terminals T are arranged side by side alternatingly in the arrangement direction, that is, the X direction. Accordingly, two rows of the battery terminals T in which the cathode sides and the anode sides are arranged side by side alternatingly are formed.

Multiple bus bars B that electrically connect the battery terminals T are provided on the secondary battery BT. Each bus bar B connects battery terminals T that are adjacent to each other, that is, a cathode-side battery terminal T and an anode-side battery terminal T. The multiple bus bars B electrically connect the multiple battery terminals T in series. The bus bars B of the present example are connected through welding to the battery terminals T, for example. The bus bars B form a group of bus bars B that are arranged on one side in the Y direction, and a group of bus bars B that are arranged on another side in the Y direction. These groups correspond to the rows of the battery terminals T that are arranged side by side in two rows. Note that in the multiple battery cells C connected in series, the bus bars B provided on the positive and negative battery terminals T on the two ends are drawn to the outside and connect the battery terminals T with an external apparatus.

The battery wiring module 1 includes multiple wire terminals 2 that are respectively connected to the multiple bus bars B, and multiple wires 3 that are respectively connected to the multiple wire terminals 2. The wire terminals 2 and the wires 3 are for voltage detection for detecting the voltages of the bus bars B, for example. The wires 3 each have one end connected to a wire terminal 2, and another end connected to a connector 4 for connecting to a voltage detection apparatus. The battery wiring module 1 is provided between the above-described two groups of the bus bars B. Note that in the drawings, the wires 3 are not illustrated, and FIG. 1 schematically shows paths through which the wires 3 pass.

The battery wiring module 1 includes a housing 10 made of an insulating resin. The housing 10 has an elongated shape that has a length direction in the X direction and has a width direction in the Y direction, for example. The housing 10 includes terminal storage portions 11 for storing the wire terminals 2, and wire storage grooves 12 for storing the wires 3.

In the housing 10, the terminal storage portions 11 include terminal storage portions 11a that are provided on one side in the Y direction and terminal storage portions 11b that are provided on the other side. The terminal storage portions 11a and the terminal storage portions 11b extend in the X direction and are arranged adjacent to different groups of the bus bars B. The terminal storage portions 11 store multiple wire terminals 2 such that they are arranged side by side in the X direction. That is, the wire terminals 2 are arranged side by side in the X direction. The wire terminals 2 are stored such that portions thereof protrude outward in the Y direction from the terminal storage portions 11 and the protruding portions are connected to the bus bars B.

The wire storage grooves 12 are arranged between the terminal storage portions 11a and the terminal storage portions 11b in the Y direction. The wire storage grooves 12 include a first storage groove 21, second storage grooves 22, and third storage grooves 23. The first storage groove 21 and the second storage grooves 22 both extend in the X direction and are arranged side by side in the Y direction. That is, the X direction corresponds to the extension direction of the first storage groove 21 and the second storage grooves 22. The third storage grooves 23 are provided between the first storage groove 21 and the second storage grooves 22 and extend in the Y direction. The first storage groove 21, the second storage grooves 22, and the third storage grooves 23 have bottom walls that oppose the secondary battery BT and pairs of side walls that are provided standing upright from the bottom walls, and are open on the sides opposite to the bottom walls, that is, on the upper sides.

The first storage groove 21 is provided on one side in the Y direction so as to be adjacent to the terminal storage portions 11a. One first storage groove 21 is provided over the entire length in the X direction in the housing 10. All of the wires 3 are drawn out from one end in the X direction of the first storage groove 21. The wires 3 are connected to the connector 4 by the ends drawn out from the first storage groove 21.

The second storage grooves 22 are provided on the other side in the Y direction so as to be adjacent to the terminal storage portions 11b. Two second storage grooves 22 of the present embodiment are provided and are both arranged side by side linearly in the X direction. For example, a part attachment portion P is provided in the space between the two second storage grooves 22. One example of a part that is attached at the part attachment portion P is a thermistor.

The first storage groove 21 and the second storage grooves 22 are spaced apart from each other in the Y direction. Here, the first storage groove 21 and the second storage grooves 22 are spaced apart from each other in the Y direction in order to, for example, provide a space for providing another member in the central portion of the secondary battery BT in the Y direction, or for providing clearance between the first storage groove 21 and second storage grooves 22 and the other member. One example of another member is an explosion-proof valve.

The third storage grooves 23 are in communication with the first storage groove 21 and the second storage grooves 22. Two third storage grooves 23, namely one third storage groove 23 that is provided between the first storage groove 21 and the second storage groove 22 on one side in the X direction, and another third storage groove 23 that is provided between the first storage groove 21 and the second storage groove 22 on the other side in the X direction, are provided. The first storage groove 21 and the second storage groove 22 on one side in the X direction are in communication with each other through the one third storage groove 23, and the first storage groove 21 and the second storage groove 22 on the other side in the X direction are in communication with each other through the other third storage groove 23. The wires 3 are passed between the first storage groove 21 and the second storage grooves 22 via these third storage grooves 23. That is, a portion of the multiple wires 3 is arranged from the first storage groove 21 to the second storage groove 22 on the one side in the X direction through the one third storage groove 23. Also, another portion of the multiple wires 3 is arranged from the first storage groove 21 to the second storage groove 22 on the other side in the X direction through the other third storage groove 23. Note that the third storage grooves 23 are each preferably arranged so as not to interfere with the other member provided in the above-described central portion of the secondary battery BT, for example.

The housing 10 includes a first cover 31 that covers the first storage groove 21, two second covers 32 that respectively cover the two second storage grooves 22, and third covers 33 that cover the third storage grooves 23. The first cover 31 and the second covers 32 are provided separately from the first storage groove 21 and the second storage grooves 22. The first cover 31 includes, on its peripheral edge, multiple engaging portions 41 that engage with the first storage groove 21. Also, the second covers 32 include, on their peripheral edges, multiple engaging portions 42 that engage with the second storage grooves 22.

Figure 2:
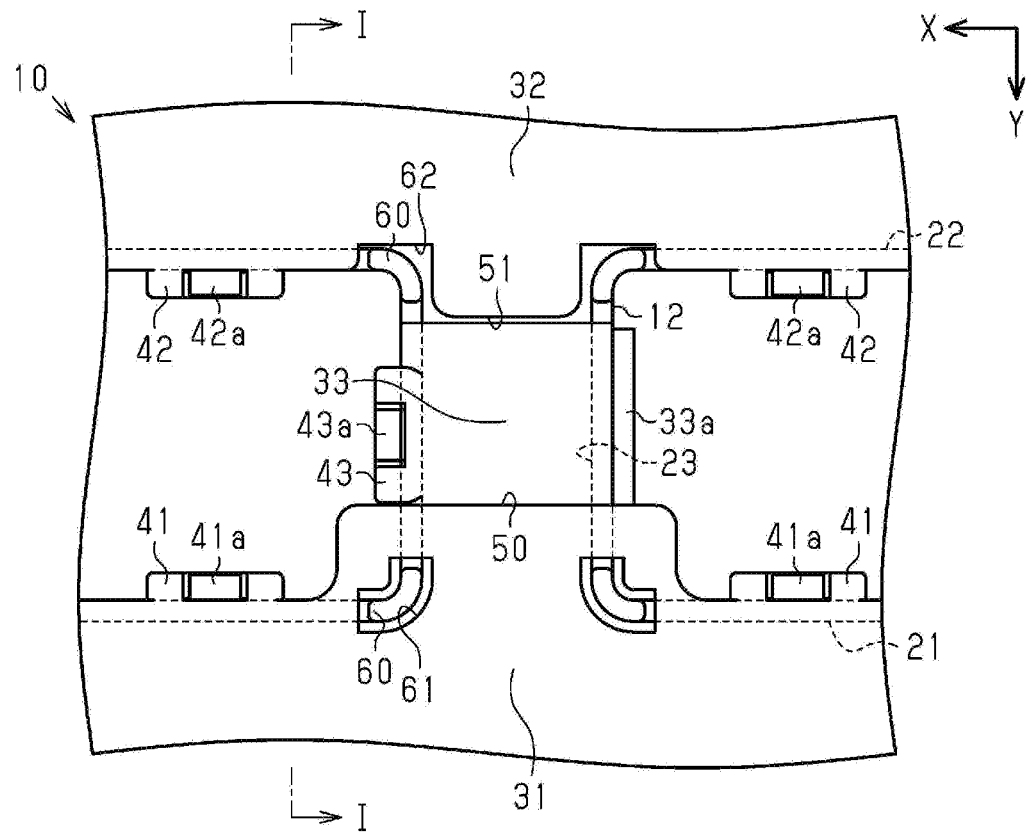
FIG. 2 is an enlarged top view of the vicinity of a third storage groove according to the embodiment.

As shown in FIG. 2, the engaging portions 41 of the first cover 31 catch on and engage with engaged portions 41a provided on a side wall of the first storage groove 21. The engaging portions 42 of the second covers 32 catch on and engage with engaged portions 42a provided on side walls of the second storage grooves 22.

Hereinafter, the configuration of the vicinity of a third storage groove 23 will be described. Here, one third storage groove 23 will be described as an example. Note that the vicinity of the other third storage groove 23 has a configuration similar to that of the one third storage groove 23. Hereinafter, if no distinction is to be made between the one and the other third storage grooves 23, they will simply be referred to as "third storage grooves 23". The same treatment will be given to the descriptions of the second storage grooves 22, the second covers 32, and the third covers 33.

As shown in FIG. 2, the third cover 33 is a hinge cover that has a hinge 33a that is joined to the third storage groove 23, and is provided in one piece with the third storage groove 23. The third cover 33 rotates between a closed position at which the third storage groove 23 is covered, and an open position at which the third storage groove 23 is not covered, using the hinge 33a as an axis. The third cover 33 has an engaging portion 43 that engages with the housing on a side opposite to the side on which the hinge 33a is provided in the X direction. The engaging portion 43 of the third cover 33 engages with the third storage groove 23 at the closed position. The engaging portion 43 catches on and engages with an engaged portion 43a provided on a side wall of the third storage groove 23.

Figure 3:
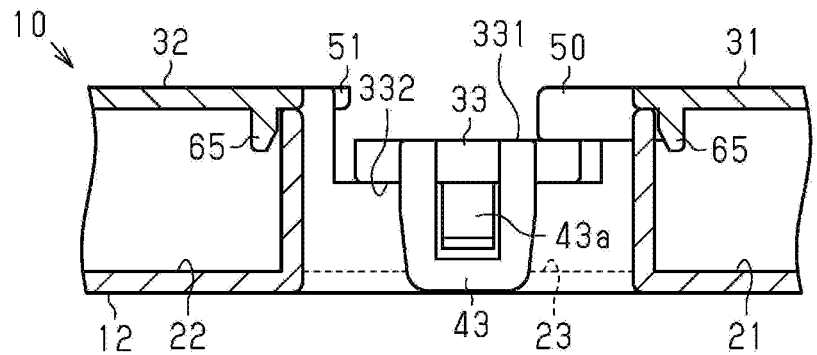
FIG. 3 is a cross-sectional view taken along line I-I in FIG. 2.

As shown in FIG. 3, the third cover 33 includes an outer surface 331 that is the upper surface and an underside surface 332 that opposes the third storage groove 23. The third cover 33 is arranged at the open position upon rotating from the closed position to the outer surface 331 side. Also, the third cover 33 is arranged at the closed position upon rotating from the open position to the underside surface 332 side.

As shown in FIGS. 2 and 3, the first cover 31 includes an abutting portion 50 that abuts on the third cover 33. The abutting portion 50 protrudes toward the third storage groove 23, that is, in the Y direction, with respect to the first storage groove 21. The abutting portion 50 is arranged over the third storage groove 23 via the third cover 33. The abutting portion 50 abuts on the outer surface 331 of the third cover 33. Note that two abutting portions 50 are provided on the first cover 31, and are provided respectively for the one third storage groove 23 and the other third storage groove 23. Some of the engaging portions 41 of the first cover 31 are provided so as to be adjacent to both sides of an abutting portion 50.

The first cover 31, the second covers 32, and the third covers are respectively attached to the upper ends of the side walls of the first storage groove 21, the second storage grooves 22, and the third storage grooves 23. In the case of the present embodiment, the side walls of the third storage grooves 23 are set to be lower in the up-down direction than the side walls of the first storage groove 21 and the second storage grooves 22. Accordingly, the third covers 33 are set at lower positions in the up-down direction than the first cover 31 and the second covers 32. Note that the bottom walls of the first storage groove 21, the second storage grooves 22, and the third storage grooves 23 are set to be the same height in the up-down direction.

The abutting portions 50 extend downward toward the third covers 33 so as to abut on the outer surfaces 331 of the third covers 33. That is, the abutting portions 50 extend downward relative to the upper ends of the side walls of the first storage groove 21.

The second covers 32 have extended portions 51 between the second covers 32 and the third covers 33 in the Y direction. The extended portions 51 extend in the Y direction from the second storage grooves 22 and cover the third storage grooves 23. The extended portions 51 and the third covers 33 are arranged at positions that do not overlap with each other in the up-down direction. The remaining portions of the third storage grooves 23 outside of the portions covered by the third covers 33 are covered by the abutting portions 50 and the extended portions 51.

Protruding portions 60 that protrude upward with respect to the other portions of the side walls of the wire storage grooves 12 are provided on the side walls at the portions at which the first storage groove 21 and the third storage grooves 23 are connected and the portions at which the second storage grooves 22 and the third storage grooves 23 are connected. The first cover 31 is provided with through holes 61 into which the protruding portions 60 are inserted. Also, the second covers 32 are provided with recessed portions 62 that are recessed in the Y direction such that the protruding portions 60 are inserted therein.

As shown in FIG. 3, ribs 65 that protrude downward are provided on the first cover 31 and the second covers 32. The ribs 65 of the first cover 31 protrude into the first storage groove 21 from the surface opposing the first storage groove 21 and extend in the X direction along the side walls of the first storage groove 21. The ribs 65 loosely fit into the inner surfaces of the side walls of the first cover 31. The ribs 65 of the second covers 32 protrude into the second storage grooves 22 from the surfaces opposing the second storage grooves 22 and extend in the X direction along the side walls of the second storage grooves 22. The ribs 65 loosely fit into the inner surfaces of the side walls of the second covers 32. The ribs 65 are provided on both the one side and the other side in the Y direction in the first cover 31 and the second cover 32. Note that in FIG. 3, only one rib 65 on the one side or the other side in the Y direction is shown on the first cover 31 and the second covers 32.

Actions of the present embodiment will be described next. Here, a procedure for assembly from a state in which the first cover 31, the second covers 32, and the third covers 33 are open, to a state in which the covers are closed, will be described. Note that the wires 3 are not illustrated in FIGS. 4 to 6.

Figure 4:
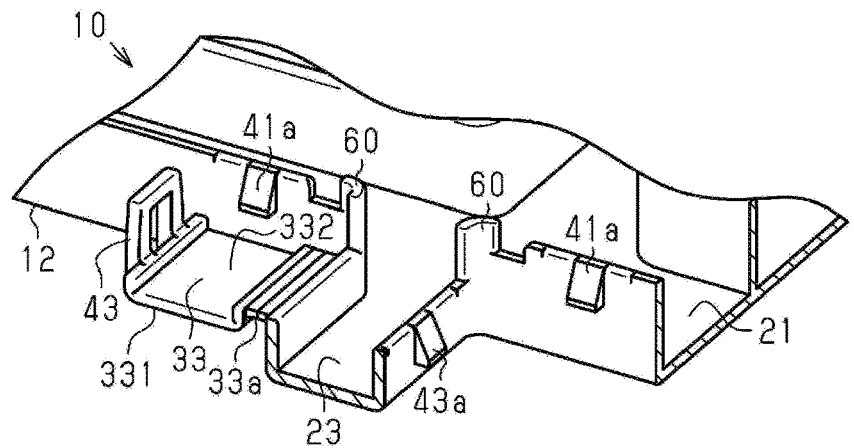
FIG. 4 is a perspective view showing a state in which a cover is open in the embodiment.

As shown in FIG. 4, in the state in which the first cover 31, the second cover 32, and the third cover 33 are open, the upper sides of the wire storage grooves 12 are open. In this state, the multiple wires 3 are arranged inside of the wire storage grooves 12 via the openings of the wire storage grooves 12. The wires 3 are arranged so as to be bent at the portions passing through the third storage grooves 23 from the first storage groove 21, and at the portions passing through the second storage grooves 22 from the third storage grooves 23. The bent portions of the wires 3 near the third storage grooves 23 are likely to pop out from the wire storage grooves 12.

Figure 5:
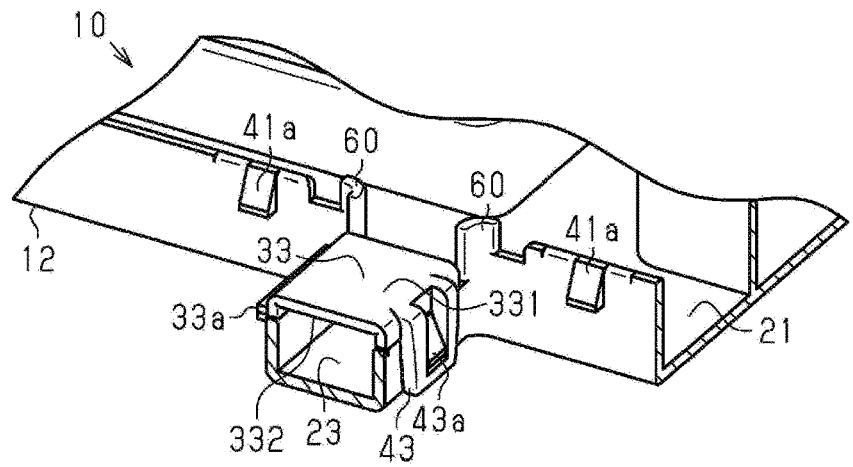
FIG. 5 is a perspective view showing a state in which a third cover in FIG. 4 is closed in the embodiment.

As shown in FIG. 5, the third covers 33 are arranged at the closed position upon being rotated from the open position to the underside surface 332 side, using the hinges 33a as axes. At the closed position, the third covers 33 cover the third storage grooves 23 and the wires 3. Accordingly, the wires 3 near the third storage grooves 23 can be suppressed from popping out. Due to the wires 3 near the third storage grooves 23, in which the wires 3 are likely to pop out, being covered, for example, it is possible to make it easier to perform the following assembly task. The engaging portions 43 are caught on the engaged portions 43a of the third storage grooves 23 and thus the third covers 33 are held at the closed position.

Incidentally, if the engaging portions 43 do not engage, the third covers 33 can change position to the open position by rotating to the outer surface 331 side using the hinges 33a as axes. For this reason, if, for example, the housing 10 warps, there has been a risk that the engaging portions 43 will disengage and the third covers 33 will open when the catching of the engaging portions 43 becomes slight. In view of this, in the present embodiment, the abutting portions 50 are provided on the first cover 31.

Figure 6:
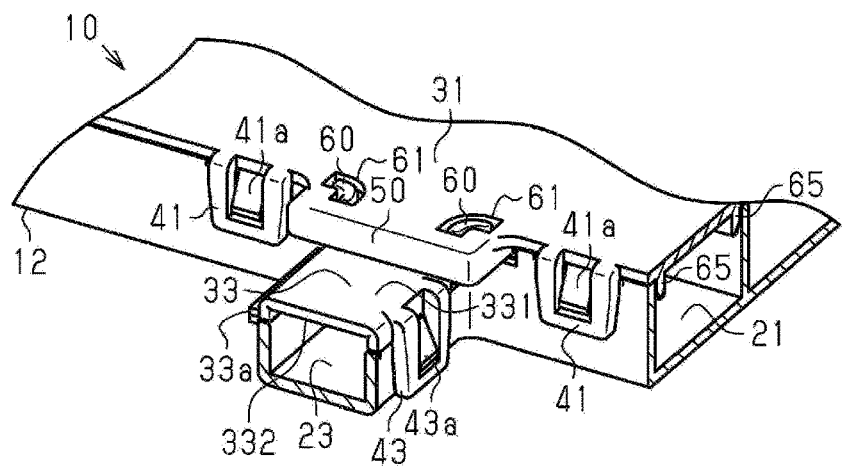
FIG. 6 is a perspective view showing a state in which a first cover in FIG. 5 is closed in the embodiment.

As shown in FIG. 6, after the third covers 33 are closed, the first cover 31 is attached to the first storage groove 21. When the first cover 31 is attached to the first storage groove 21, the first storage groove 21 and the wires 3 are covered, and the abutting portions 50 cover the third covers 33 from above. The abutting portions 50 can suppress rotation of the third covers 33 to the outer surface 331 side by abutting on the outer surfaces 331 of the third covers 33. That is, the abutting portions 50 can suppress opening of the third covers 33 and can hold the third covers 33 in the closed position. Also, the abutting portions 50 protrude downward toward the third covers 33 so as to abut on the third covers 33. Accordingly, the displacement of the third covers 33 can be suppressed to a small amount.

The first cover 31 engages with the first storage groove 21 using the multiple engaging portions 41. Movement of the first cover 31 with respect to the first storage groove 21 is suppressed due to the ribs 65 being inserted into the first storage groove 21. The first cover 31 is held in the first storage groove 21 by the multiple engaging portions 41 and the ribs 65, and is less likely to come off of the wire storage grooves 12 compared to the third covers 33. Also, some of the engaging portions 41 of the first cover 31 are provided adjacent to both sides of the abutting portions 50. For this reason, the forces acting on the abutting portions 50 can be supported by the engaging portions 41 on both sides of the abutting portions 50 due to the third covers 33 opening from the closed position. Accordingly, the third covers 33 can be held more firmly. Note that the second covers 32 are also held in the second storage grooves 22 by the multiple engaging portions 42 and the ribs 65.

The through holes 61 are provided in the first cover 31. The first cover 31 is positioned with respect to the wire storage groove 12 due to the protruding portions 60 being inserted into the through holes 61. For this reason, the positions of the abutting portions 50 can be matched with the positions of the third covers 33.

The second covers 32 are attached to the second storage grooves 22 before, after, or during the closing of the third covers 33. Since the extended portions 51 provided on the second covers 32 are arranged at positions that do not overlap with the third covers 33, the extended portions 51 do not interfere with the third covers 33. For this reason, the order of the step of attaching the second covers 32 and the step of closing the third covers 33 does not matter. Upon being attached to the second storage grooves 22, the second covers 32 cover the wires 3 and the second storage grooves 22, and the extended portions 51 cover the third storage grooves 23. The second covers 32 are positioned with respect to the wire storage grooves 12 due to the protruding portions 60 being inserted into the recessed portions 62.

Effects of the present embodiment will be described next.

(1) The housing 10 of the battery wiring module 1 includes a first storage groove 21 and second storage grooves 22 that all extend in the X direction and are arranged side by side in the Y direction orthogonal to the X direction, and third storage grooves 23 that are in communication with the first storage groove 21 and the second storage groove 22. Also, the housing 10 includes a first cover 31, second covers 32, and third covers 33 that respectively cover the first storage groove 21, the second storage grooves 22, and the third storage grooves 23. The first cover 31 has abutting portions 50 that abut on the outer surfaces 331 of the third covers 33 on the side opposite to the underside surfaces 332, which oppose the third storage grooves 23. With this configuration, it is possible to suppress movement of the third covers 33 to the outer surface 331 side due to the abutting portions 50 of the first cover 31 abutting on the outer surfaces 331 of the third covers 33. That is, it is possible to suppress movement of the third covers 33 in a direction of separating from the third storage grooves 23, and it is possible to hold the third covers 33 in a state of covering the third storage grooves 23. Accordingly, the third covers 33 can be suppressed from coming off.

(2) The multiple wire terminals 2 are arranged side by side in the X direction, which is the extension direction of the first storage groove 21 and the second storage grooves 22. With this configuration, it is possible to achieve a configuration in which the multiple wire terminals 2 are easily arranged along the first storage groove 21 and the second storage grooves 22 when the multiple wire terminals 2 are arranged side by side in one direction.

(3) The abutting portions 50 protrude toward the third storage grooves 23 relative to the first storage groove 21. With this configuration, the abutting portions 50 can protrude over the third storage grooves 23. The abutting portions 50 can suitably hold the third covers 33 in a state of covering the third storage grooves 23 by abutting on the third covers 33 over the third storage grooves 23.

(4) The first cover 31 includes the engaging portions 41 that engage with the first storage groove 21, and the engaging portions 41 are provided at positions adjacent to the abutting portions 50. With this configuration, the forces acting on the abutting portions 50 are received by the engaging portions 41 adjacent to the abutting portions 50 when the third covers 33 attempt to move in the direction of separating from the third storage grooves 23. In this manner, it is possible to suppress a case in which the abutting portions 50 rise due to the abutting on the third covers 33 and the movement of the third covers 33 is no longer suppressed by the abutting portions 50. As a result, it is possible to suitably suppress a case in which the third covers 33 come off.

(5) The engaging portions 41 are provided on both sides of the abutting portions 50. With this configuration, it is possible to more suitably suppress the rising of the abutting portions 50 due to the abutting with the third covers 33, and as a result, it is possible to more suitably suppress a case in which the third covers 33 come off.

(6) The third covers 33 are joined to the third storage grooves 23 via the hinges 33a. The third covers 33 are arranged at the open position at which the third storage grooves 23 are not covered, due to rotation from the closed position at which the third storage grooves 3 are covered to the outer surface 331 side using the hinges 33a as axes. With this configuration, when the third storage grooves 23 are to be covered, the third covers 33 are merely rotated to the closed position. For this reason, the third covers 33 can be easily attached near the third storage grooves 23 at which the wires 3 are likely to pop out. This can contribute to an improvement in assemblability. Also, the rotation of the third covers 33 to the outer surface 331 side can be suppressed by the abutting portions 50, and therefore it is possible to suitably suppress a case in which the third covers 33 come off.

(7) The second covers 32 include extended portions 51 that extend over the third storage grooves 23 along the Y direction, between the second covers 32 and the third covers 33. Accordingly, the third storage grooves 23 can be covered not only by the third covers 33, but also by the extended portions 51, and therefore the portions that are not covered by the third covers 33 in the third storage grooves 23 can be covered by the extended portions 51. This can contribute to the protection of the third storage grooves 23. Also, due to the extended portions 51 and the third covers 33 not overlapping in the up-down direction, it is possible to achieve a configuration in which the second covers 32 and the third covers 33 do not interfere with each other. This can contribute to an improvement in assemblability.

The present embodiment can be implemented with the following modifications. The present embodiment and the following modified examples can be implemented in combination with each other as long as there are no technical discrepancies.

The second covers 32 may also be attached at any timing before, after, or during the closing of the third covers 33. The second covers 32 may also be attached at any timing before, after, or during the attaching of the first cover 31.

The third covers 33 may also be provided separately from the third storage grooves 23. That is, the third covers 33 are not limited to hinge covers.

The first cover 31 may also be provided in one piece with the first storage groove 21. The second covers 32 may also be provided in one piece with the second storage grooves 22. For example, the first cover 31 and the second covers 32 may also be hinge covers. That is, the first cover 31 and the second covers 32 are not limited to being provided separately from the wire storage grooves 12.

The first storage groove 21 may also be provided divided into multiple first storage grooves 21, and two or three or more first storage grooves 21 may also be provided. In this case, the multiple first storage grooves 21 may also be provided arranged side by side linearly in the X direction. That is, there is no limitation to only one first storage groove 21 being provided over the entire length in the X direction in the housing 10. In addition, only one second storage groove 22 may also be provided over the entire length in the housing 10. That is, there is no limitation to providing multiple second storage grooves 22 in the X direction. Furthermore, the wires 3 may also be drawn out from the second storage groove 22 and connected to the connector 4.

Multiple first covers 31 may also be provided with respect to one first storage groove 21 so as to divide the first storage groove 21. Multiple second covers 32 may also be provided with respect to one second storage groove 22 so as to divide the second storage groove 22.

The abutting portions 50 need not protrude downward so as to abut on the third covers 33.

The abutting portions 50 need not protrude in the Y direction relative to the first storage groove 21. This can be applied to a configuration in which, for example, the third covers 33 are provided extending into the first storage groove 21. That is, the shapes of the abutting portions 50 are not particularly limited, as long as they abut on the third covers 33.

The extension direction of the first storage groove 21 and the second storage grooves 22 need not be the direction in which the battery cells C are arranged side by side. That is, the first storage groove 21 and the second storage groove 22 may also extend in a direction orthogonal to the direction in which the battery cells C are arranged side by side.

The first storage groove 21 and the second storage grooves 22 may also be provided with curving portions or changing widths, so long as they extend in one direction overall. The first storage groove 21 and the second storage grooves 22 may also be portions that are not parallel.

The number of the third storage grooves 23 is not particularly limited, and one, two, three, or more third storage grooves 23 may also be provided. In addition, multiple third storage grooves 23 may also be provided between the first storage groove 21 and one second storage groove 22.

The arrangement of the wires 3 and the wire terminals 2 is not limited to the above-described embodiment. For example, the wires 3 may also be arranged so as to be extended from the second storage grooves 22 to the first storage groove 21 via the third storage grooves 23. The wire terminals 2 may also be arranged side by side in a direction intersecting the extension direction of the first storage groove 21 and the second storage grooves 22. Also, the arrangement of the wire storage grooves 12 and the terminal storage portions 11 is not limited to the above-described embodiment. The terminal storage portions 11 may also be arranged between the wire storage grooves 12, and the terminal storage portions 11 may also be provided in one row. These can be modified as appropriate according to the specification.

The number of battery cells C is not limited to the present embodiment. The numbers of the battery terminals T, the wire terminals 2, and the wires 3 can be modified as appropriate according to the number of the battery cells C.

The battery is not limited to the secondary battery BT.

The battery wiring module 1 is not limited to being mounted on a battery mounted in a vehicle, and can be mounted on batteries mounted in various apparatuses.

LIST OF REFERENCE NUMERALS

1 Battery wiring module
2 Wire terminal
3 Wire
4 Connector
10 Housing
11 Terminal storage portion
11a Terminal storage portion
11b Terminal storage portion
12 Wire storage groove
21 First storage groove
22 Second storage groove
23 Third storage groove
31 First cover
32 Second cover
33 Third cover
33a Hinge
331 Outer surface
332 Underside surface
41 Engaging portion
41a Engaged portion
42 Engaging portion
42a Engaged portion
43 Engaging portion
43a Engaged portion
50 Abutting portion
51 Extended portion
60 Protruding portion
61 Through hole
62 Recessed portion
65 Rib
B Bus bar
BT Secondary battery
C Battery cell
P Part attachment portion
T Battery terminal

What is claimed is:

1. A battery wiring module comprising:
   a plurality of wire terminals that are respectively connected to a plurality of bus bars that connect battery terminals of a plurality of battery cells;
   a plurality of wires that are respectively connected to the plurality of wire terminals; and
   a housing storing the plurality of wire terminals and the plurality of wires,
   wherein the housing includes a first storage groove for storing the wires, a first cover for covering the first storage groove, a second storage groove for storing the wires, a second cover for covering the second storage groove, a third storage groove for storing the wires, and a third cover for covering the third storage groove,
   each of the first storage groove and the second storage groove extends in a first direction,
   the first storage groove and the second storage groove are spaced from each other in a second direction, the second direction being orthogonal to the first direction,
   the third storage groove is in communication with the first storage groove and the second storage groove,
   the third cover includes an underside surface that opposes the third storage groove and an outer surface on a side opposite to the underside surface, and
   the first cover includes an abutting portion that extends over the third storage groove in the second direction and contacts the outer surface of the third cover.

2. The battery wiring module according to claim 1, wherein
   the plurality of wire terminals are arranged side by side in the extension first direction along each of the first storage groove and the second storage groove.

3. The battery wiring module according to claim 1, wherein
   the abutting portion protrudes toward the third storage groove relative to the first storage groove.

4. The battery wiring module according to claim 1, wherein the first cover includes engaging portions for engaging with the first storage groove, and the engaging portions are provided at positions adjacent to the abutting portion.

5. The battery wiring module according to claim 4, wherein the engaging portions are provided on both sides of the abutting portion.

6. The battery wiring module according to claim 1, wherein the third cover is joined to the third storage groove via a hinge, and the third cover is arranged at an open position at which the third storage groove is not covered, through rotation from a closed position at which the third storage groove is covered, to the outer surface side, using the hinge as an axis.

7. A battery wiring module comprising:

a plurality of wire terminals that are respectively connected to a plurality of bus bars that connect battery terminals of a plurality of battery cells;

a plurality of wires that are respectively connected to the plurality of wire terminals; and a housing storing the plurality of wire terminals and the plurality of wires, wherein the housing includes a first storage groove for storing the wires, a first cover for covering the first storage groove, a second storage groove for storing the wires, a second cover for covering the second storage groove, a third storage groove for storing the wires, and a third cover for covering the third storage groove, the first storage groove and the second storage groove extend in the same direction as each other and are arranged side by side in a direction orthogonal to the extension direction, the third storage groove is in communication with the first storage groove and the second storage groove, the third cover includes an underside surface that opposes the third storage groove and an outer surface on a side opposite to the underside surface, the first cover has an abutting portion that abuts on the outer surface of the third cover, and the second cover includes an extension portion that extends over the third storage groove in the orthogonal direction.

8. The battery wiring module according to claim 1, wherein the third storage groove extends in the second direction.

9. The battery wiring module according to claim 1, wherein each of the first storage groove and the second storage groove includes a bottom wall and side walls extending in the first direction, and the third storage groove extends between a side wall of the first storage groove and a side wall of the second storage groove that face and are adjacent to each other in the second direction.

10. The battery wiring module according to claim 1, wherein the abutting portion extends downward such that a lower end of the abutting portion is positioned lower than an upper end of a side wall of the first storage groove.

11. The battery wiring module according to claim 1, wherein a lower surface of the abutting portion of the first cover contacts the outer surface of the third cover.

* * * * *